United States Patent [19]

Yang

[11] 3,784,293
[45] Jan. 8, 1974

[54] NON-REGULAR FOUR BLADE SHUTTER
[76] Inventor: Eugene Li-Chun Yang, 710 W. Haven Dr., Arlington Heights, Ill. 60095
[22] Filed: Jan. 4, 1973
[21] Appl. No.: 320,870

[52] U.S. Cl. .............................................. 352/208
[51] Int. Cl. ............................................. G03b 9/10
[58] Field of Search ..................... 352/208, 219, 220

[56] References Cited
UNITED STATES PATENTS
2,052,960  9/1936  Berggren ............................. 352/208
2,073,798  3/1937  Hillman ............................... 352/208

Primary Examiner—Monroe H. Hayes

[57] ABSTRACT

A non-regular four-blade shutter for motion picture projector which provides a composite of a two-blade shutter which gives maximum light and a three-blade shutter which provides minimum flicker. The present shutter transmits more light than a three-blade shutter without undesirable light modulation or flicker.

2 Claims, 2 Drawing Figures

NON-REGULAR FOUR BLADE SHUTTER

This invention relates to shutters for motion picture projectors, and more particularly, to a non-regular four-blade shutter.

In motion picture projectors, two-blade shutters transmit maximum light and three-blade shutters provide minimum flicker. Various attempts have been made to get more light transmission from a three-blade shutter by making it asymmetric. However, this results in undesirable light modulation. The present invention provides a shutter whereby light is increased over a three-blade shutter without undesirable side effects. The present invention can continuously bridge the gap between a two-blade and a three-blade shutter. For instance, it can provide a shutter having light transmission equivalent to a 2.5-blade shutter without undesirable side effects.

A typical three-blade shutter has blades with an included angle of 50° which would give 210° of light exposure. The shutter of the present invention will give more light exposure than this without undesirable side effects such as light modulation and flicker, which are annoying to the viewer. The providing of more light lowers the power requirements for the projector.

Accordingly, a principal object of the invention is to provide new and improved shutter means for motion picture projectors.

Another object of the invention is to provide a new and improved four-blade shutter for a motion picture projector.

Another object of the invention is to provide a new and improved shutter for motion picture projectors which transmit more light than a conventional three-blade shutter without undesirable light modulation or flicker.

Another object of the invention is to provide a new and improved four-blade shutter having light transmission characteristic between that of a two-blade shutter and that of a three-blade shutter.

These and other objects of the invention will be apparent from the following specification and drawings, of which:

Figure 1:
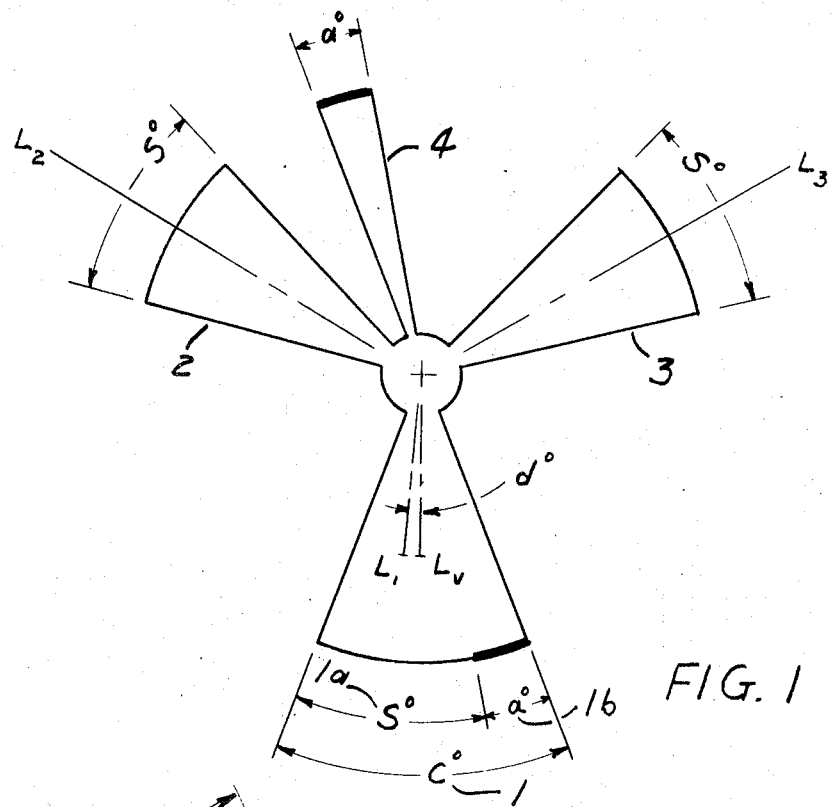
FIG. 1 is a plan view of an embodiment of the invention.

FIG. 1 is a generalized configuration of the invention. Blade 1 is the actual shutter blade which measures C degrees, which is equal to the pulldown angle of the film indexing mechanism. Blade 1 is symmetric to a vertical line Lv and can be visualized as consisting of two joined sectors $1a$ and $1b$. Blade 2, blade 4, and blade 3 are here for anti-flicker and anti-modulation purposes.

Blades $1a$, 2 and 3, each measuring S degrees, are symmetric about lines L1, L2, and L3 which are spaced 120° apart. Line L1 is displaced from the vertical line Lv by $d$ degrees.

Blades $1b$ and blade 4 are diametrically opposite and each measures $a$ degrees. Thus the composite shutter is a superposition of a three-blade shutter with a two-blade shutter.

The theory of operation is as follows: If $a=0°$, then $S=C°$, and the shutter degenerates into a regular three-blade shutter. If $a=C°$, then $S=0°$, and the shutter degenerates into a regular two-blade shutter. If $0°<a<C°$, the shutter has four blades with both light output and flicker characteristics somewhere between a conventional two-blade and three-blade shutters.

In actual design application, C is known being governed by the pulldown angle of the film-indexing mechanism. One is free to choose $a$ to obtain the desired light output. After choosing $a$, the other angles are given by the following equations:

$$S = C - a$$

$$d = \text{one-half } (a)$$

More specifically, referring to FIG. 1, the invention is a composite of a three-blade shutter having blades $1a$, 2 and 3 each having an included angle of S°, and a shutter comprising of blades $1b$ and 4 each having an included angle of $a°$ and are diametically opposite of each other. Blades $1a$ and $1b$ merge to form blade 1 which together with blades 2, 4, and 3 constitutes a non-regular four-blade shutter. The angle $a$ may be chosen by experimentation for a particular application, and the other angles will be given by the equations listed above. The angle C is a constant which is equal to the pulldown mechanism of the film advance, i.e., the angle of the film cycle wherein the film is being advanced.

Figure 2:
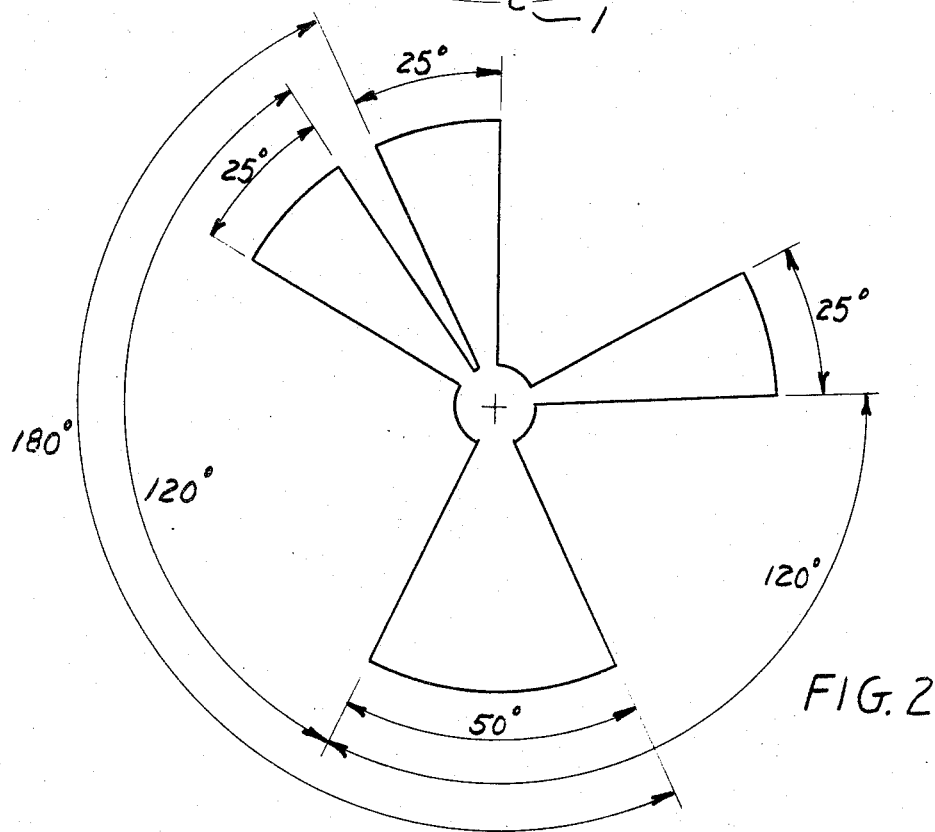
FIG. 2 is a plan view of an embodiment of the invention having equivalent light trnasmission of a 2.5-blade shutter.

Referring to FIG. 2, a specific example is given for $C=50°$. If $a$ is chosen to be 25°, then $S=25°$, and the specific measurements are as shown.

Having 235° of exposure, this shutter is equivalent to a shutter having 2.5 50°-blades in terms of light output (for $C=50°$, a two-blade shutter has 260° of exposure while a three-blade shutter has a 210° of exposure). This shutter gives greater light output than a three-blade shutter, yet exhibits, subjectively, less temporal light modulation than a two-blade shutter.

I claim:

1. A four-blade shutter for a motion picture projector wherein C° is the pulldown angle of the film-advance mechanism of said projector comprising:
    a first blade having an included angle of C degrees which is visualized to consist of two joined parts $1a$ and $1b$ measuring respectively S degrees and a degrees, blade $1a$ being symmetric about line L1,
    second and third blades, each measuring S degrees and symmetrically located about lines L2 and L3 where L1, L2 and L3 are spaced 120° apart, and
    a fourth blade diametrically opposite $1b$ measuring $a$ degrees.

2. Apparatus as in claim 1 and having the following parameters:
$a = C(3-N_e)$
$S = C(N_3 - 2)$
$d = C \text{(one-half)}(3-N_e)$ where $N_e$ is the equivalent number of blades and $2 \leq N_e \leq 3$, and $d$ is the angle between a line $L_v$ bisecting said first blade and a line L1 bisecting part $1a$ of said first blade.

* * * * *